United States Patent [19]

Brandsen et al.

[11] 4,434,922
[45] Mar. 6, 1984

[54] FLEXIBLY-SUPPORTED, PIVOTABLE LOAD CARRIER FOR VEHICLES

[76] Inventors: Donald H. Brandsen, 11401 Culver Blvd., Los Angeles, Calif. 90066; Griffith L. Hoerner, 2211 Montana Ave., Santa Monica, Calif. 90403

[21] Appl. No.: 495,748

[22] Filed: May 18, 1983

[51] Int. Cl.³ .............................................. B60R 9/06
[52] U.S. Cl. .............................. 224/314; 224/42.03 B; 224/321; 224/329
[58] Field of Search ............. 224/314, 311, 319, 321, 224/330, 309, 329, 42.05, 42.03 R, 42.03 B; 414/465, 466

[56] References Cited

U.S. PATENT DOCUMENTS

| | | | |
|---|---|---|---|
| 3,670,935 | 6/1972 | Hinkston | 224/42.03 B |
| 3,710,999 | 1/1973 | Allen | 224/321 X |
| 4,301,956 | 11/1981 | Hoerner | 224/311 |
| 4,336,897 | 6/1982 | Luck | 224/42.03 B |
| 4,354,625 | 10/1982 | Peoples | 224/329 |

*Primary Examiner*—Steven M. Pollard
*Attorney, Agent, or Firm*—Jay H. Quartz

[57] ABSTRACT

A carrier for carrying loads, e.g., bicycles, external to a vehicle is described. It comprises: an inverted U-shaped frame which is usually disposed in an upright position when in use; a set of flexible straps which attach to the lower end of the frame and to an anchor point within a vehicle cavity, e.g., a trunk; a cam attached to each leg of the frame to distribute load forces over the straps, to aid in tensioning the straps to enhance their function of supporting the frame and the load, and to space the carrier from a vehicle; and an adjustable belt connecting the upper end of the frame to the vehicle so that adjustment of the belt permits the frame to pivot about the cams so that it can be rotated downwardly to engage a load which, when attached to the frame, can be raised by appropriate adjustment of the belt to obviate the need to lift the load up to the upright carrier.

The carrier can be readily removed from a vehicle by disconnecting the straps at their anchor points. The frame can then be folded into a bundle for storage. Alternatively, the carrier may be stored along the underside of a trunk lid or other closure.

24 Claims, 6 Drawing Figures

FLEXIBLY-SUPPORTED, PIVOTABLE LOAD CARRIER FOR VEHICLES

PRIOR ART

Many carriers are presently available for transporting loads, e.g., bicycles, motorcycles, luggage, etc., externally on vehicles (cars, trucks, vans, etc.). Some are designed to be essentially permanently attached to a vehicle, whereas others are designed to be removed after each use. A common characteristic of these carriers is that they are attached completely or essentially completely externally to a vehicle. Additionally, as to those carriers which are designed to be removed after each use, there is an often complicated and time-consuming procedure for removing and mounting them. Furthermore, because the frames of presently-available carriers are of essentially unitary construction, a significant amount of trunk space is taken by those carriers when they are stored in a trunk (even though feet and leg sections may be folded into the frame).

When using prior art carriers, it is necessary to manually lift loads to the level of the assembled carrier. This often means lifting loads to shoulder height and holding them at that height while the load is attached to its carrier. This is often an impossible task for many adults including women, older persons, and handicapped people.

Another problem with many presently-available carriers is that they are supported directly by vehicle panels (roofs, trunk lids, etc.). Therefore, such carriers can, and do, mar a vehicle's finish even though the carriers may be provided with rubber feet, etc.

An exception to the foregoing is the carrier which is described in U.S. Pat. No. 4,301,956, issued Nov. 24, 1981 and entitled "Retractable Bicycle Carrier For Vehicles." That carrier is mounted on the underside of a trunk lid and is placed in load-carrying position by extending its load-supporting components beyond the edges of the trunk lid. It eliminates many of the disadvantages of the other carriers because it leaves essentially all of the trunk available for the storage of other articles when it is also stored in the trunk, it is easily and simply extended to its load-carrying position, and it permits ready access to a trunk. However, some trunk lids may not be sufficiently strong to support it and pendent loads from the underside thereof without special reinforcement. Additionally, a trunk lid must be open when that carrier is in use.

SUMMARY OF THE INVENTION

The described invention is embodied in a load carrier for use with vehicles for carrying various types of loads externally to the vehicle. The carrier is usually disposed in an upright position for carrying loads, but it may be disposed in a more horizontal position depending upon vehicle body conformation.

The preferred embodiment comprises: load-supporting means disposed in an upright position for load carrying; flexible anchoring means for connecting, directly or indirectly, the lower end of the load-supporting means to an anchor point within a vehicle cavity, e.g. a trunk; take-up means attached to the lower end of the load-supporting means and in circumferential contact with the anchoring means for distributing loads thereover and for tensioning the anchoring means, as well as for spacing the load-supporting means from a vehicle; and adjustable retaining means for aiding in maintaining the load-supporting means in an upright position and for facilitating the lifting of loads by the carrier. In a modified embodiment, the load-supporting means is provided with auxiliary legs for aiding in spacing the load-supporting means from a vehicle.

The described carrier has several advantages over prior carriers. It is anchored to a point inside a vehicle and, because of the thinness of the anchoring means, a vehicle closure such as a trunk lid can be closed in a normal manner, that is, without modifying the vehicle's locking mechanism.

The take-up means and the flexible anchoring means permit the load-supporting means to pivot and rotate about its lower end so that the upper end can be lowered to engage loads (rather than require loads to be raised to the level of the carrier). Rotation of the load-supporting means is facilitated by the adjustable retaining means which, by appropriate selection, can provide any desired mechanical advantage. Thus, even heavy loads can be lifted from, and lowered to, the ground by a person of modest strength because such persons do not have to physically lift loads onto or off the described carrier.

Because of the unique co-operation of the flexible anchoring means and take-up means, the former is effectively stiffened to provide a firm, strong support for the load-supporting means. Additionally, this support is provided without resting a load-supporting means on a vehicle (with certain limited exceptions). This means that potential damage to a vehicle's surface is minimized.

Finally, the described carrier can be easily erected to its load-supporting position and easily stored in a trunk or independently of a vehicle. Because the load-supporting means can be made foldable, it takes very little space when stored in a vehicle's trunk.

DESCRIPTION OF THE FIGURES

FIG. 4 also shows the carrier mounted on a vehicle having a different rearend conformation than that shown in FIG. 1.

DESCRIPTION OF THE PREFERRED EMBODIMENT

The described invention is embodied in a load carrier for vehicles. A preferred embodiment is shown in the Figures in its load-supporting position on the rearend of an automobile (although it may be carried at other locations on a vehicle). In general terms, the preferred embodiment comprises: load-supporting means to which a load can be attached for support away from a vehicle's body; flexible anchoring means attached to a lower end of the load-supporting means and to an interior surface of a vehicle cavity, e.g., a trunk, for anchoring the load-supporting means to a fixed position within the vehicle cavity and for providing a base support for the load-supporting means; take-up means attached to the lower end of the load-supporting means and in contact with the anchoring means for tensioning the latter, for spacing the load-supporting means from a vehicle, and for distributing loads transmitted to the anchoring means from the load-supporting means to prevent load-induced stress concentrations in the anchoring means; and adjustable retaining means attached to the upper end of the load-supporting means and to the vehicle for aiding in maintaining the load-supporting means in a generally upright position when supporting a load and for facilitating the raising and lowering of loads to and from that upright position.

Figure 1:
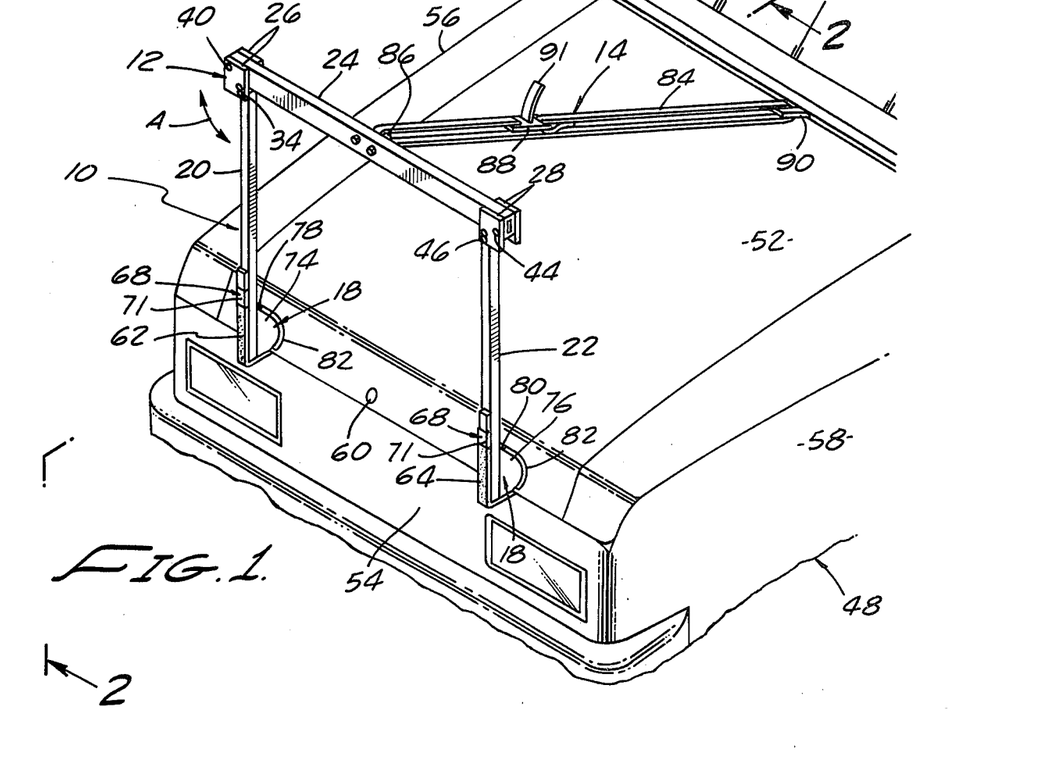
FIG. 1 is a perspective view of one embodiment of the invention showing it mounted on the rearend of a vehicle.
Figure 2:
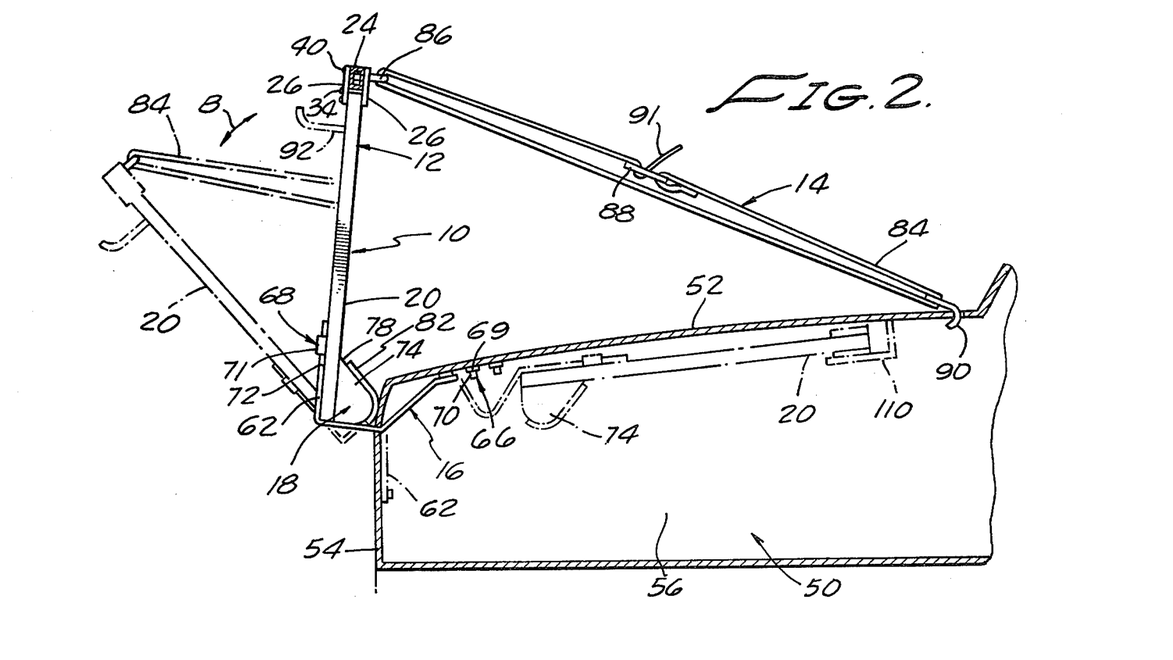
FIG. 2 is a side elevational view of the carrier of FIG. 1 taken along the view lines 2—2 and further showing the carrier in its stored position within a trunk and in an intermediate position in outline.
Figure 3:
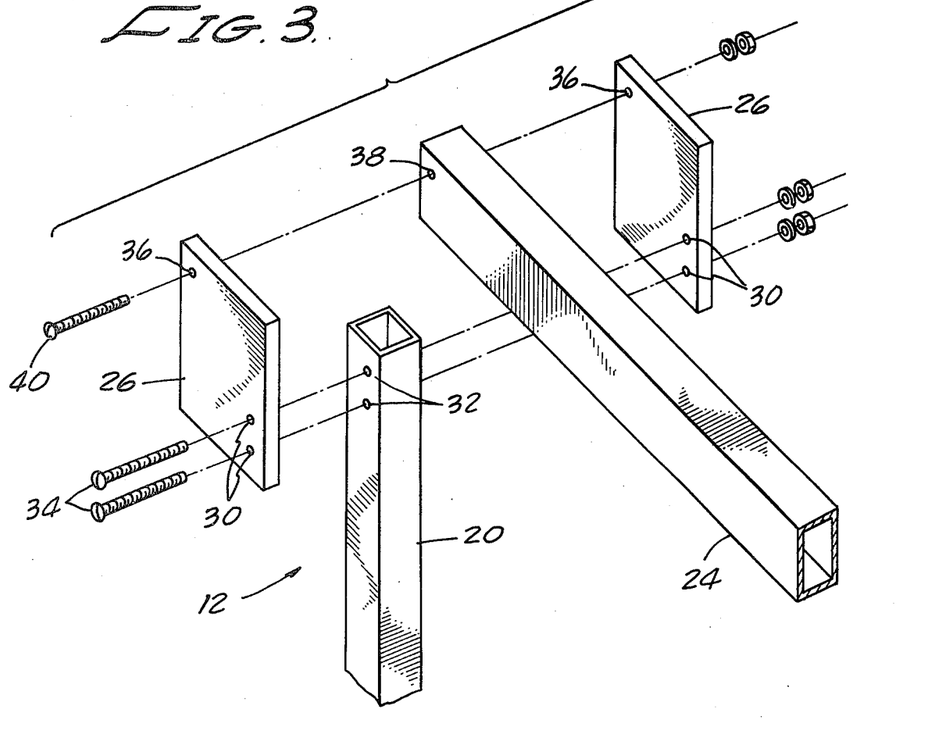
FIG. 3 is an exploded perspective view of a preferred means for connecting the cross-member of the load-supporting frame of the carrier of FIG. 1 to the legs thereof.

Turning now to the Figures and, initially, to FIGS. 1-3 for a more detailed description, the numeral 10 designates a load carrier comprising load-supporting means in the form of a foldable frame 12, retaining means 14 in the form of an adjustable belt, flexible anchoring means 16 in the form of straps and associated hardware, and take-up means 18 in the form of a cam or lobe.

The foldable frame 12 comprises a pair of spaced-apart, upstanding legs 20,22 and a cross-member 24 which is pivotally connected to the frame legs adjacent to their upper ends (as viewed in FIGS. 1 and 2) to permit the legs to swing outwardly away from each other in the plane of the frame. The pivotal connection between the cross-member 24 and the frame legs 20,22 is made so that the legs can be folded against or into the cross-member for storage. Such pivotal connection could be made simply by passing pins through aligned openings in the cross-member ends and in the upper leg ends so that the legs would pivot with respect to the cross-member. However, it is presently preferred to utilize paired mounting plates 26,26 and 28,28 to provide pivotal interconnection between the cross-member 24 and each of the frame legs 20,22, respectively.

As shown in FIG. 3, each of a first pair of mounting plates 26 defines one or more holes 30 extending transversely therethrough in a lower, inner corner (as viewed in FIG. 1) for alignment with holes 32 extending in a forward-rearward direction (as viewed in FIG. 1) through upper end sections of one frame leg 20. A bolt or similar fastener 34 extends through each resulting set of aligned holes 30,32,30 to afix the mounting plates 26 to their related frame leg 20. A hole 36 is also formed in each of the first pair of mounting plates 26 in a corner diagonally opposite to the corner which defines the fixed-point holes 30 which receive the bolts 34. That is, a hole is formed in the outer, upper corner of each of the first pair of mounting plates 26 to provide a pivot point. The mounting plates 26 are positioned relative to one end of the cross-member 24 so that the pivot-point holes 36 formed in the plates align with an aperture 38 extending transversely through the cross-member in a forward-rearward direction adjacent to an upper edge of the cross-member. The aligned holes 36,36 and aperture 38 receive a pin 40 which permits the one frame leg 20 to pivot freely in the Plane of the frame 12 as indicated by the arrow A in FIG. 1.

In like manner to that described for the first pair of mounting plates 26, holes (not shown) diagonally opposite to each other are formed in the second pair of mounting plates 28 in mirror image to those in the first pair of mounting plates 26 for alignment with corresponding apertures (not shown) formed in the other end of the cross-member 24 and in the upper end section of the other frame leg 22 for likewise receiving a second pivot pin 44 and a second set of one or more bolts 46. However, instead of pivotally connecting the second set of plates 28 to the cross-member 24 by a pin extending through a hole adjacent to the upper edge of the cross-member as is done with respect to the pin 40 extending through the first set of mounting plates 26, the pin 44 extends through a hole in the cross-member 24 adjacent to its lower edge. By this arrangement, the legs 20,22 pivot about pivot axes which do not lie in the same horizontal plane. The resulting relative eccentricity enables the legs 20,22 to be folded against each other in juxtaposition with the cross-member 24 as will be further described with reference to FIG. 5 hereinafter.

The legs 20,22 and cross-member 24 are structurally rigid members and may be formed from any materials and have any configuration which imparts such rigidity. The frame members 20,22,24 may be solid, tubular or channels and may be formed from metals, wood, or reinforced plastic.

The load-supporting frame rests on, and is supported by, the flexible anchoring means 16 which also functions to attach the frame to a vehicle 48. For exemplary purposes only, the vehicle 48 is shown in FIGS. 1 and 2 as having a trunk cavity 50 defined, in part, by a lid or closure 52 which covers an opening which provides access to the trunk and by a rear wall 54 and side walls 56,58. The trunk lid 52 is hinged at a forward edge and is lockable in its closed position (FIG. 1) by a conventional lock 60. Although a conventional trunk is shown in FIG. 1, it is to be understood that the described load carrier can be used in association with other vehicle closures such as the essentially vertical closures at the rear of some vans and microbuses for closing engine, storage and passenger compartments.

The flexible anchoring means 16 comprises strap means in the form of a pair of straps 62,64 and associated connector means for connecting the straps to the carrier frame 12 and to the trunk interior. The straps 62,64 may be made from any suitable material which can withstand the tension forces produced in the straps by loads carried on the frame 12. A particularly useful material is nylon webbing.

The connector means may connect the straps 62,64 to the frame 12 and trunk interior at only single points so that the effective strap length is fixed and constant. Such connection may be detachable or fixed. To enable the carrier 10 to be used in association with a variety of vehicles, it is preferred that the connector means detachably connect the straps 62,64 to the frame 12, to the trunk interior, or to both and that it be adjustable to permit the effective length of the straps to be changed by adjustment of either or both ends of the straps. To accomplish these goals, the connector means may comprise sets of fasteners 66 which connect one (an inner) end of each of the straps 62,64 to at least one trunk interior surface and buckle connectors 68 which connect the other (outer) end of each strap, directly or indirectly, to one of the frame legs 20,22. The fasteners 66 may be any type which can withstand the shear forces applied thereto by loads carried on the carrier 10.

A suitable type for use with bicycle carriers is the type which is utilized with tonneau covers and comprises female components 69 embedded in one end section of each strap 62,64 and matable male components 70 secured to a trunk cavity-defining wall (which includes the closure and floor) as shown in FIG. 2 in solid line (to a closure) and in dashed line (to the rear wall).

Figure 4:
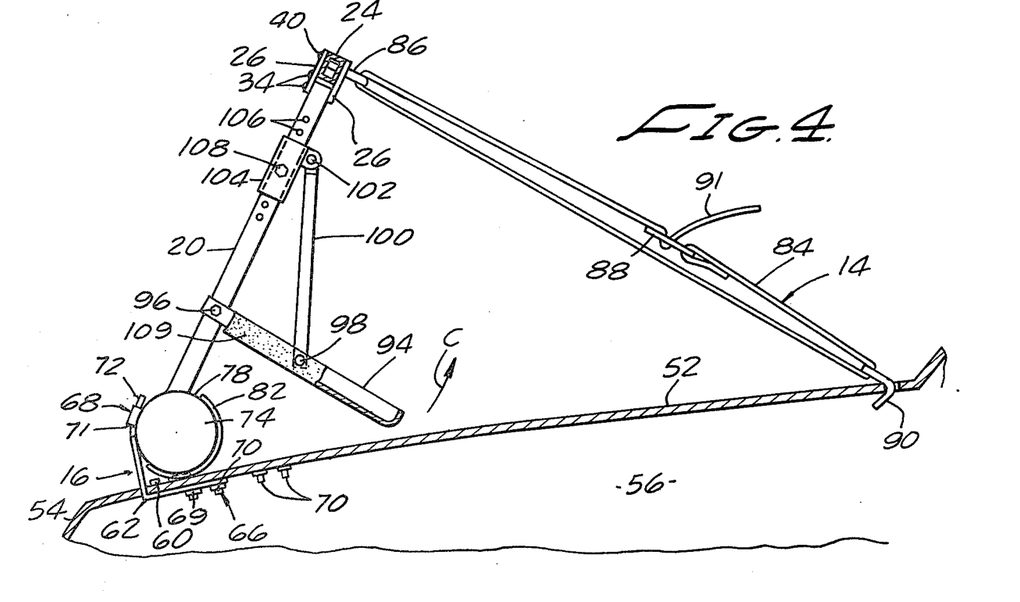
FIG. 4 is a side elevational view of another embodiment of the invention showing it mounted as in FIG. 2 and as viewed in FIG. 2.

The buckle connectors 68 may be of the tongue-and-groove type. Each comprises a slotted female member 71 afixed to a lower end section of one of the legs 20,22, that is, directly to the load-supporting means as shown in FIG. 1 or, alternatively, afixed to the take-up means 18, that is, indirectly to the load-supporting means as shown in FIG. 4 and comprises a tongue-like male component 72 which is adjustably attached to one of the straps 62,64. Each male member 72 is lockably receivable by an associated female member 71.

To change the effective length of the straps 62,64, the male members 72 can be appropriately located by adjustment of the straps and/or the pairing of the male and female fastener components 69,70 can be varied. As can be seen from FIG. 2, the effective length of each strap 62,64 is the shortest length of that strap between each fastener 66 and buckle connector 68 pair. Another way of defining the effective length of each strap 62,64 is to regard the effective length as the shortest strap length between the frame 12 (or take-up means 18) and the entry points of that strap into the vehicle cavity 50.

The fasteners 66 and the buckle connectors 68 could be reversed or other connector means, such as tamper-proof connectors, could be used.

The take-up means 18 comprises a pair of cams or lobes 74,76. Each cam 74,76 is planar and has a circumferential surface 78,80, respectively, which may be circular (as shown in FIG. 4) or which may be non-circular (as shown in FIG. 2) to facilitate attachment to the legs 20,22 and to better conform to the shape of a vehicle deck, etc., against which the cams abut. Additionally, it is preferred that the circumferential surfaces 78,80 of the cams 74,76 have a shape which minimizes stress concentrations in the straps 62,64. Attachment of the cams 74,76 to the frame legs 20,22 may be made by any appropriate means as, for example, by screws (not shown) or by press-fitting the lower ends of the legs into radially-extending blind holes in the cams (FIG. 4). Each cam 74,76 is disposed in a vertical plane perpendicular to that of the frame 12 and extends forwardly of the legs 20,22 (as viewed in FIG. 1).

The relationship between each cam, e.g. 74, and its associated strap 62 is such that the cam's circumferential surface 78 in surface-to-surface contact, that is rolling contact, with the strap (see FIG. 1) so that the latter is rolled onto, or wrapped up by, the cam as the cam rolls along the strap toward its inner end. The result is that associated members, for example, leg 20, strap 62, and cam 74, lie in the same (forward/rearward) plane at essentially right angles to the plane of the frame 12 and the cam and leg of each such group rotate forwardly and rearwardly in their common plane.

The cams 74,76 may be made of metal, wood or plastic and may be variously sized. For protection of vehicle surfaces, it is preferred to cover those areas of the cams 74,76 which may contact a vehicle with a soft material 82.

The adjustable retaining means 14 comprises a belt 84 one end of which loops through a d-ring 86 attached to the cross-member 24 intermediate its ends and then passes through a friction buckle 88. The other end of the belt 84 loops through a slotted claw 90 which is adapted to grip the forward edge of the trunk lid 52 and then fixedly attaches to the buckle. The belt 84 can be loosened or tightened to lower or raise, respectively, the frame 12 as indicated by the arrow B in FIG. 2. In place of the belt 84 which provides minimum mechanical advantage in the raising and lowering of loads, other pulley devices which provide greater mechanical advantage may be used.

To position the load carrier 10 in its load-carrying position of FIG. 1 (from its stored position), the frame 12 is opened if it has been folded for storage and is disposed behind the vehicle 48 (its upper end can even be rested on the ground) and, with the trunk lid 52 open, the free ends of the straps 62,64 are connected to the male components 70 of the fasteners 66 mounted on the undersurface of the trunk lid (or any other trunk-defining surface) unless such connection already exists as a result of the carrier being stored along the undersurface of the trunk lid as will be described. The straps 62,64 are then extended over the upper edge of the rear wall 54 and the belt claw is positioned to grip the forward edge of the trunk lid 52. The latter 52 is then closed to retain the straps 62,64 between the confronting surfaces of the rear wall 54 and trunk lid and to retain the claw 90 between confronting surfaces of the trunk lid and adjacent edge of the vehicle deck. At this time, the buckle 68 connecting the straps 62,64 to the frame legs 20,22 may be adjusted, if necessary, so that the forward edges of the cams 74,76 are located adjacent to the upper edge of the rear trunk wall 54 when the frame 12 is in an upright position. By loosening the belt 84, the frame 12 can be lowered by allowing it to pivot about the cams 74,76 under the influence of gravity (or any load that it may be supporting) until the cross-member 24 is lowered sufficiently for engagement with a load, for example, to the position shown in dashed line FIG. 2. A load may be attached to the cross-member 24 by any suitable means such as a bungie cord. If loads such as bicycles are to be loaded on to the carrier 10, it may be provided with rearwardly-extending arms 92 (shown in outline in FIG. 2) afixed to the frame legs 20,22 to support the bicycles thereon by their top tubes. By tightening the belt 84, the carrier 10 and load are raised to the carrier's load-carrying position. When that position is reached, the straps 62,64 should be fully tensioned.

The tension in the straps 62,64 increases as the cams 74,76 rotate or roll along the straps under the influence of the attempted pivotal rotation of the frame 12 about the cams as its cross-member 24 is subjected to a forward-pulling force exerted by the belt 84. The rotation of the cams 74,76 continues along the straps 62,64 until the cams directly abut the vehicle 48 (see FIG. 6A) or indirectly abut the vehicle (see FIG. 6B where the strap 62 is squeezed between the cam 74 and vehicle wall 54). If the abutment is indirect, the frame 12 can be rotated in a forward direction (toward the vehicle 48) thereby causing the cams 74,76 to continue to rotate along the straps 62,64 until the cams directly abut the vehicle. After there is direct abutment between the cams 74,76 and vehicle 48, further rotation of the frame 12 may be required to cause the cams to rotate or roll along the vehicle past the strap entry point to the trunk 50 (the interface between the trunk lid 52 and rear wall 54) until the straps are "fully tensioned" as shown in FIG. 6A and as further described below.

It is preferred that all of the slack in the straps 62,64 be taken up by the cams 74,76 when the frame 12 is in a substantially upright position although that is not necessary to the proper functioning of the carrier 10 as the carrier, in its load-carrying position, may be canted at a considerable angle to the vertical and still perform satisfactorily. The desired orientation of the carrier frame 12 can be realized by judicious sizing of the cams 74,76 and adjustment of the effective length of the straps 62,64. When the carrier 10 has been rotated into its load-carrying position, the cams 74,76 will have been rotated into abutment with the vehicle 48 and the straps 62,64 will have been fully tensioned (by being wrapped up on the cams). Reference to the straps 62,64 as being wrapped up on the cams 74,76 is to that portion of the straps which is external to the vehicle 48. Should abutment of the cams 74,76 against the vehicle 48 and full tensioning of the straps 62,64 occur before the frame 12 has been rotated into its load-carrying position or only when the frame has been rotated past its load-carrying position, re-adjustment of the effective strap length by adjustment of the connector means 66,68 will remedy the particular problem. Increasing or decreasing the effective strap length remedies the former and latter problems, respectively.

The frame 12 is maintained in its load-carrying position by the forces exerted thereon through the straps 62,64 and through the belt 84. These forces produce moments about the cams 74,76 which act as fulcrums. Prior to the frame 12 reaching its load-supporting position, the belt force moment exceeds that of the strap forces thereby causing the cams 74,76 to continue to wrap up the straps 62,64 until the load-supporting position is reached. At that point, these moments are equal and opposite to each other and the frame 12 is stabilized in its load-supporting position.

From the foregoing, it will be apparent that the cams 74,76 must not be so small that the frame 12 is permitted to contact, and to come to rest on, the vehicle 48. At the other end of the size spectrum, the cams 74,76 must not be so large that a load cannot be lifted off the ground. Within these limits, it is preferable to adjust the cam size to minimize the torque applied at the cams 74,76 by a load (which means being able to raise a carrier frame at least into a substantially vertical position as close as possible to a vehicle) and to fully tension the straps 62,64 when the minimal torque position is reached. The straps 62,64 will be fully tensioned when they are wrapped up by the cams 74,76 so that they extend rearwardly or outwardly from their entry points into the trunk cavity 50 in a substantially straight line and substantially perpendicularly to a vehicle wall at those entry points. When fully tensioned, the external sections of the straps 62,64 may be horizontal or angled with respect to the horizontal depending upon the location of the strap entry points. The straps 62,64 act like, that is, simulate, rigid members when at full tension with the cams 74,76 abutting the vehicle 48 adjacent to, but past (in the wrap-up direction) the strap entry points to the trunk cavity 50. The purpose in fully tensioning the straps 62,64 is to substantially eliminate "bounce" of the frame 12 and load which can occur if the straps merely function as hangars.

Figure 6:
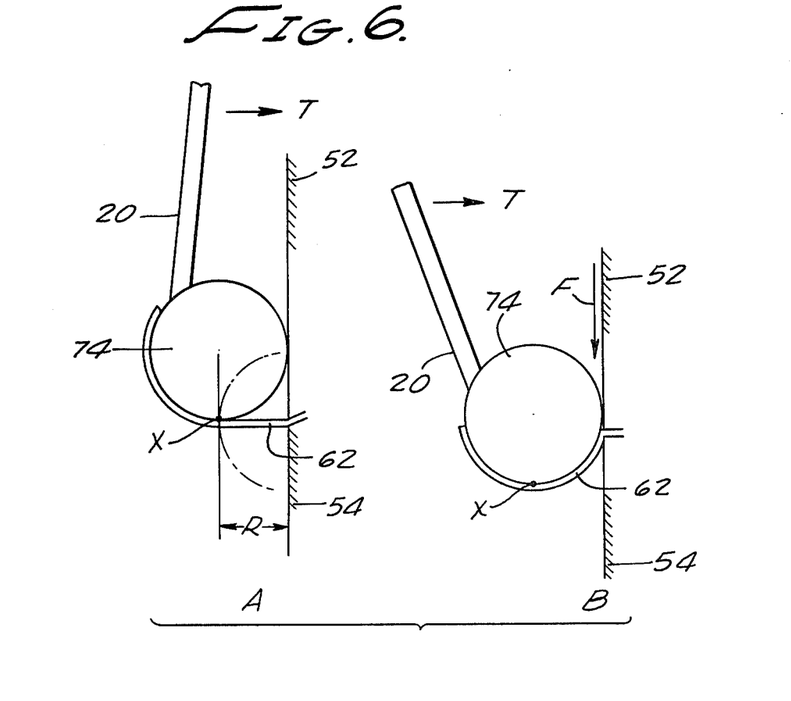
FIG. 6 is a diagrammatic illustration of the functioning of the take-up means and related components of the described carrier when mounted on the rearend of a vehicle.

The foregoing discussion of the preferred fully tensioned straps 62,64 is illustrated in FIG. 6A in which the distance along the strap 62 between its point of entry into the trunk and its initial point of contact X with the cam 74 is equal to R. Potential movement of the point X about the strap entry point into the vehicle cavity would describe a circle of radius R about that point such that, if point X moved from its position in FIG. 6A, it would move toward the vehicle 48. However, that movement cannot take place in an upward direction (as viewed in FIG. 6) because the cam is thereby forced toward the vehicle which it already abuts. And such movement cannot take place in a downward direction because of the force T applied to the carrier 10 by the retaining means 14. That force T prevents counterclockwise rotation of the cams 74,76 (as viewed in FIG. 6), thereby preventing the cams from rotating or rolling outwardly along the straps 62,64 to produce "play" in the straps which, if it existed, would permit the carrier to drop below its FIG. 6A position. Therefore, point X is essentially prevented from moving so that "bounce" is substantially eliminated.

In some cases, it may be desirable to allow the cams 74,76 to hang suspended below the entry points of the straps 62,64 into a vehicle. This is illustrated in FIG. 6B wherein the distance along the strap 62 from point X to the strap entry point into the vehicle 48 is greater than R (of FIG. 6A). Therefore, point X can move up and away from the vehicle if, for example, the latter hits a bump. This means that the cam 74 can move upward with respect to the vehicle 48 thereby producing "bounce." To counter this effect, a tie-down cord can be used to connect the frame or cam to a point on a vehicle below either the frame or the cam.

In FIGS. 6A and 6B, the force T exerted by the retaining means on the frame serves to force the cams against a vehicle. However, this force T alone is not sufficient to prevent movement of a carrier relative to a vehicle and, unless prevented from doing so as described, the cams 62,64 can move upwardly along a vehicle against the friction force F acting along the vehicle wall.

It has been stated that various types of pulley arrangements can be used to aid in raising a load. Additionally, extensions 93 (shown in FIG. 2 in dashed line) may be added to the upper ends of the frame legs 20,22 to increase the moment arm between a person raising a load and the cams 74,76 (without changing the load moment arm) and thereby correspondingly reduce the force needed to raise a load. The leg extensions 93 could be carried in the upper end sections of the legs 20,22 if the latter are hollow and the retaining means could be attached to such extensions.

Thus far, the invention has been described with reference to vehicle conformations which permit a carrier to be positioned a spaced distance from (behind or in front of) a vehicle so that the vehicle body does not directly support the carrier and there is little chance of damaging the vehicle. However, there are some vehicle conformations which prevent the aforementioned positioning of a carrier. A particular example is shown in FIG. 4 in which the rear wall 54 immediately to the rear of the trunk lid 52 is essentially horizontal so that the space between confronting surfaces of the rear wall and trunk lid is effectively vertical. In such a case, "bounce" is eliminated only by rotating the cams 74,76 so that the frame 12 is angled considerably forwardly toward the trunk lid from the vertical. Even in this position, the carrier, designated here by the numeral 10', rests on the vehicle 48. Therefore, to substantially eliminate potential damage to the vehicle's painted surfaces, it is preferred to provide the carrier with auxiliary legs 94.

The auxiliary legs 94 are connected to, and extend forwardly from, the carrier frame legs 20,22. The former are angled with respect to the latter so that they (the auxiliary legs) will just contact a trunk lid when the carrier 10' is in its load-supporting position. The auxiliary legs 94 may be fixed in a particular position for a particular vehicle conformation or, preferably, they are made adjustable as shown in FIG. 4 where one such leg 94 is shown pivotally connected to one of the frame legs 20 by a first pin 96 passing through aligned holes (not shown) in the auxiliary leg and frame leg. Intermediate its ends, the auxiliary leg is connected pivotally through a second pin 98 to one end of a hinge rod 100 which, in turn, is pivotally connected at its other end through a hinge pin 102 to a tubular slide 104. The latter has an inner cross-section conforming to the outer cross-section of the frame leg 20 so that it is free to slide up and down that leg. To fix the slide 104 in a desired position, one side of the frame leg 20 is provided with a plurality of linearly-spaced blind holes 106 and the slide carries a screw 108 (or other fastener) which is threadable through an internally threaded hole extending transversely through a side of the slide overlying the blind holes and which is receivable by those holes to locate the slide. When not in use, the auxiliary leg 94 can be folded against the frame leg 20 by turning the screw 108 out of its related blind hole 106 and moving the slide upward toward the cross-member 24. This movement of the slide 104 pulls the hinge rod 100 upwards causing the auxiliary leg 94 to pivot about the two pivot pins 96,98 (indicated by the arrow C in FIG. 4) and into juxtaposition with the hinge rod 100 and frame leg 20.

To protect a vehicle, the auxiliary legs 94 may be at least partially covered with fabric 109 like that used on the cams 74,76. Additionally, the free ends of the auxiliary legs 94 may be provided with a spring-biased foot to absorb shock.

Figure 5:
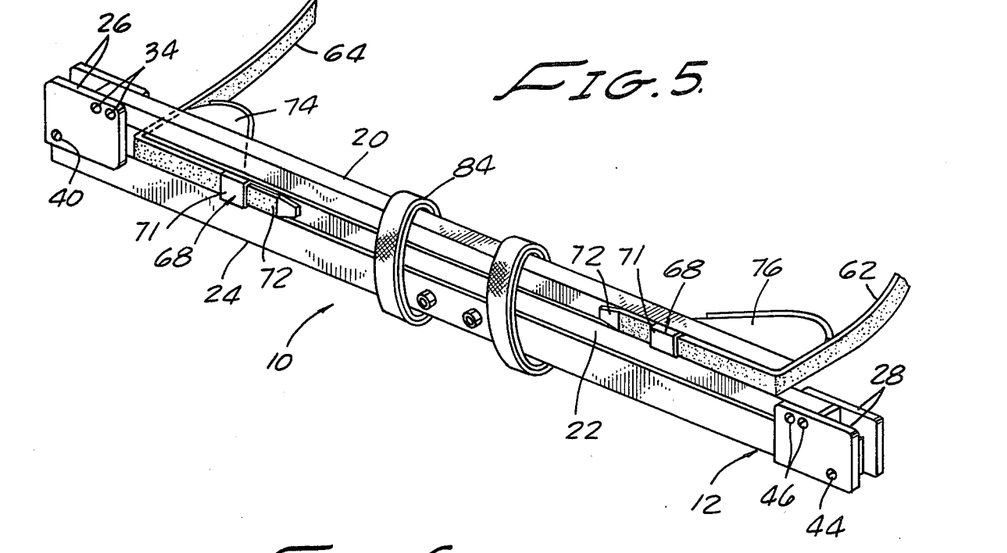
FIG. 5 is a perspective view of the carrier of FIG. 1 showing it in its folded position for storage.

To store the carrier 10, any load is removed and the belt 84 is loosened or the belt is first loosened to allow the frame 12 to pivot downwardly and then the load is removed from the carrier. In either case, the belt 84 is loosened sufficiently to permit some "unwrapping" of the straps 62,64 to enable the trunk lid 52 to be opened. This permits release of the belt claw 90 from its imprisonment between confronting surfaces of the trunk lid 52 and of the vehicle deck forwardly thereof. With the trunk lid 52 open, the straps 62,64 can be unfastened at their forward ends by disengagement from each other of the female and male components 69,70 of the fasteners 66 carried on the straps and trunk lid (or other trunk surface), respectively. Thereafter, the frame legs 20,22 can be rotated outwardly away from each other about the mounting plates 26,28 until they are juxtaposed alongside each other and the cross-member 24 as shown in FIG. 5. This folded position is made possible by the eccentric pivoting, vis-à-vis each other, of the frame legs 20,22 on the cross-member 24 as has been described. To hold the frame legs 20,22 and cross-member 24 in their juxtaposed positions, the belt 84 can be wrapped around them as shown in FIG. 5. In its folded position, the carrier 10 can be stored in a vehicle or independently thereof. Alternatively, the carrier 10 can be left connected to a trunk lid by its straps 62,64 and its frame 12 can be rotated into a position along the underside of the trunk lid 52 and suspended therefrom at its upper end from a hook 110 depending from the trunk lid adjacent to its forward edge and engagable with the d-ring 86 on the cross-member 24 (as shown in outline in FIG. 2).

Various modifications of the described preferred embodiment will be apparent from the foregoing description to those skilled in the art. For example, other pivot connections at the frame leg cross-member junctures could be used to allow the legs to pivot in different directions relative to each other or to support the cross-member a spaced distance above the legs (rather than on them as shown). Also, unitary frames could be used in place of the described folding frame. While lacking in one or more of the advantageous features of the preferred embodiment, each of these (and other) possible modifications made within the scope of this invention embody the cam (which permits pivotal movement of the frame) and adjustable belt and strap features.

We claim:

1. A load carrier for use with a vehicle having a cavity defined by vehicle interior surfaces, said load carrier comprising:
    load-supporting means for supporting a load thereon when in a load-supporting position externally of said vehicle, said load-supporting means having first and second ends, said first end being generally lower than said second end in said load-carrying position; and
    take-up means connected to said first end of said load-supporting means for wrapping up
    flexible anchoring means for connecting said load-supporting means to at least one of said interior surfaces defining said cavity, said anchoring means having a first end connected to said first end of said load-supporting means or to said take-up means and having a second end connectable to at least one said cavity-defining, interior surface, said take-up means being in rolling contact with said anchoring means for wrapping up said anchoring means when said take-up means is rotated along said anchoring means towards said second end thereof.

2. The carrier of claim 1 which further includes:
    retaining means connectable to said second end of said load-supporting means and to said vehicle for aiding in maintaining said load-supporting means in said load-supporting position.

3. The load carrier of claim 2 wherein each of said anchoring means and said retaining means is adjustable.

4. The load carrier of claim 1 wherein said anchoring means is adjustable.

5. The load carrier of claim 1 wherein said load-supporting means comprises:
    a cross-member;
    a pair of legs having first and second ends, said take-up means being connected to said first ends of said legs and said anchoring means being connected to said first ends of said legs or to said take-up means; and
    attachment means for pivotally connecting said legs to said cross-member, said attachment means pivotally connecting each end of said cross-member to a different one of said ends of said legs to permit said legs to be folded into juxtaposition with said cross-member for storage and to permit said legs to support said cross-member in said load-supporting position.

6. The load carrier of claim 5 which further includes:
    retaining means connectable to said cross-member and to said vehicle for aiding in maintaining said load carrier in said load-supporting position.

7. The load carrier of claim 6 wherein said retaining means is adjustable to facilitate rotationally raising and lowering said load-supporting means to and from, respectively, said load-supporting position.

8. The load carrier of claim 6 or 7 wherein said anchoring means is adjustable to change the effective length of said anchoring means.

9. The load carrier of claim 1 or 2 which further includes:
auxiliary legs carried on said load-supporting means for spacing said second end of said load-supporting means from said vehicle when said load-supporting means is in said load-supporting position.

10. The load carrier of claim 1 or 2 wherein said anchoring means comprises:
at least one strap; and
connector means operably associated with each said strap for connecting one end of each said strap to said load-supporting means or to said take-up means and for connecting the other end of each said strap to at least one said surface defining said cavity.

11. The load carrier of claim 1 which further includes:
load engagement means carried on said load-supporting means for attaching a load to said load-supporting means.

12. A load carrier for use with a vehicle having a cavity defined by vehicle interior surfaces, said load carrier comprising:
a frame for supporting a load thereon when in a load-supporting position, said frame comprising
a pair of legs having first and second ends,
a cross-member, and
means for pivotally connecting said second end of each said leg to a different end of said cross-member to permit said legs to pivot into a folded position in juxtaposition with said cross-member for storage and to permit said legs to pivot into position to support said cross-member in said load-carrying position;
a pair of cams, each said cam being attached to a different frame leg adjacent to said first end thereof;
a pair of straps;
adjustable connector means associated with each of said straps for varying the effective length of said straps, for connecting one end of each said strap to a different one of said legs adjacent its first end or of said cams and for connecting the other end of each said strap to at least one of said cavity-defining, interior surfaces, said straps being in contact and aligned with said cams to permit rotation of said cams along said straps, each member of each associated leg, cam and strap lying in a plane substantially perpendicular to that of said frame.

13. The load carrier of claim 12 which further includes:
adjustable retaining means connectable to said cross-member and to said vehicle for aiding in maintaining said frame in said load-supporting position and for facilitating the raising and lowering of said frame into and from, respectively, said load-supporting position.

14. The load carrier of claims 12 or 13 which further includes:
auxiliary legs carried on each of said frame legs for spacing said second ends of said frame legs from said vehicle.

15. The load carrier of claim 12 which further includes:
load engagement means carried on said frame for attaching a load to said frame.

16. In combination with a vehicle having a cavity defined by interior surfaces of contiguous wall members and of a closure for closing an opening which provides access to said cavity and which is defined by free edges of said wall members, said closure being hingedly connected to said vehicle along one side of said closure, a load carrier which comprises:
load-supporting means for supporting a load thereon when in a load-supporting position externally of said vehicle adjacent to said closure, said load-supporting means having first and second ends, said first end being generally lower than said second end in said load-supporting position;
take-up means connected to said first end of said load-supporting means for spacing said load-supporting means from said vehicle and for use in wrapping up
flexible anchoring means for supporting said load-supporting means, said anchoring means having a first end connected to said first end of said load-supporting means or to said take-up means and having a second end connected to at least one said cavity-defining, interior surface, said anchoring means entering said cavity at entry points distal from said hinged one side of said closure, said take-up means being in rolling contact with said anchoring means for wrapping up said anchoring means when said take-up means is rotated along said anchoring means towards said second end of said anchoring means; and
retaining means having a first end connected to said second end of said load-supporting means and a second end connected to said vehicle along said hinged one side of said closure, said retaining means cooperating with said anchoring means and said take-up means to maintain said load-supporting means in said load-supporting position;
said closure being closable when said load carrier is in said load-supporting position to hold said second end of said retaining means against said hinged one side thereof and to sandwich said anchoring means between said closure and a free edge of said wall member distal from said hinged one side.

17. The load carrier of claim 16 wherein the effective length of said anchoring means is such that, when said carrier is in said load-supporting position, said anchoring means is fully tensioned by said take-up means and said take-up means abuts said vehicle adjacent to, but past said strap entry points to said cavity.

18. The load carrier of claim 16 wherein said anchoring means is adjustable to vary said effective length of said anchoring means.

19. The load carrier of claim 18 wherein said effective length of said anchoring means is adjusted to abut said take-up means against said vehicle adjacent to, but past said strap entry points and to fully tension said anchoring means when said load-supporting means is in said load-supporting position.

20. The load carrier of claim 18 wherein said retaining means is adjustable to permit said second end of said load-supporting means to rotate downwardly away from said vehicle about its said first end to engage a load and to permit said load-supporting means and said engaged load to be raised to said load-supporting position by tightening said retaining means.

21. The load carrier of claim 20 wherein said anchoring means comprises:
   at least one strap; and
   first and second connector means operably associated with each said strap for adjustably connecting said straps to said load-supporting means or to said take-up means and to said vehicle, said first connector means being carried on each said strap adjacent to one end thereof and on said load-supporting means or on said take-up means to cooperatively connect said one end of each said strap to said load-supporting means or to said take-up means, respectively, said second connector means being carried on each said strap adjacent to the other end thereof and on at least one of said cavity-defining, interior surfaces to cooperatively connect said other end of each said strap to said vehicle.

22. The load carrier of claim 21 wherein said second connector means is carried on each said strap and on said interior surface of said closure, and wherein said load carrier further includes:
   suspension means carried on said second end of said load-supporting means and on said interior surface of said closure for suspending said load carrier from said closure for storage when said closure is closed.

23. The load carrier of claim 16 which further includes:
   auxiliary legs carried on said load-supporting means for spacing said second end of said load-supporting means from said vehicle when said load-supporting means is in said load-carrying position.

24. The load carrier of claim 16 which further includes:
   load engagement means carried on said load-supporting means for attaching a load to said load-supporting means.

* * * * *